(12) United States Patent
Joseph

(10) Patent No.: US 7,257,214 B2
(45) Date of Patent: Aug. 14, 2007

(54) LOW COST MIGRATION TO A VOIP SYSTEM

(75) Inventor: Anish Pulikottil Joseph, Karnataka (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 280 days.

(21) Appl. No.: 10/646,373

(22) Filed: Aug. 22, 2003

(65) Prior Publication Data
US 2005/0041785 A1     Feb. 24, 2005

(51) Int. Cl.
*H04M 3/42* (2006.01)
*H04M 3/00* (2006.01)

(52) U.S. Cl. ............... 379/211.02; 379/265.01
(58) Field of Classification Search .......... 379/211.02, 379/265.01–265.14
See application file for complete search history.

(56) References Cited

U.S. PATENT DOCUMENTS 6,870,835 B1 * 3/2005 Chen et al. ................ 370/354
2002/0085701 A1 * 7/2002 Parsons et al.
2002/0188755 A1 * 12/2002 Yeom
2003/0002479 A1 * 1/2003 Vortman et al.
2003/0072330 A1 * 4/2003 Yang et al.
2003/0086556 A1 * 5/2003 Welch, III et al.
2004/0019700 A1 * 1/2004 Ilan et al.
2004/0141508 A1 * 7/2004 Schoeneberger et al.
2004/0160946 A1 * 8/2004 Fowler
2004/0180621 A1 * 9/2004 Fowler

FOREIGN PATENT DOCUMENTS

WO      WO 01/06740     * 1/2001

* cited by examiner

*Primary Examiner*—William J. Deane, Jr.

(57) ABSTRACT

A call management method includes receiving an incoming call and transferring the call to an intended recipient device. If the recipient device does not answer the incoming call, the call is transferred to an intranet gateway. If the intended recipient is logged on to the intranet or is otherwise accessible on the network, the intranet gateway determines the network location of the intended recipient and transfers the call to the intended recipient. If the intended recipient is inaccessible, the incoming call is transferred to a call recordation system.

22 Claims, 3 Drawing Sheets

LOW COST MIGRATION TO A VOIP SYSTEM

TECHNICAL FIELD

The present invention relates generally to methods of and apparatus for redirection of calls in communications systems. More particularly, although not exclusively, the invention relates to dynamic redirection of incoming telephony calls and subsequent recordation and forwarding of associated voicemail.

BACKGROUND ART

In standard Public Switched Telephone Network (PSTN) systems, it is well know to manage incoming calls using a Private Automated Branch Exchange (PABX) to transfer calls to the intended recipient. FIG. 1 is a simplified schematic diagram of a prior art Enterprise context where an enterprise 11 has a PABX 12 which routes incoming calls 1 to telephones 13a, 13b etc. Details of the operation of the PABX are not discussed in detail as they are considered within the knowledge of one skilled in the art.

When an incoming call 1 is received from the PSTN network 10, the PABX 12 diverts 2 the call to the required extension. If the phone 13 at the extension is unanswered, the PABX 12 switches the call to the voicemail system 14 whereby the caller is invited to leave a voicemail for the intended recipient. In most enterprises the telephones are standard analog or digital devices.

In enterprises employing an intranet, voice-over-IP (VoIP) phones may be used with enhanced flexibility. This situation is shown in FIG. 2 where a call 1 is received by way of a standard PSTN network 20. However, in this case, communications within the enterprise 24 are effected by specific VoIP phones 22a, 22b etc. The VoIP gateway 21 receives the incoming call 1 and depending on the intended recipient, transfers 2 the call via the intranet 25 to the required VoIP phone 22. Communication over the intranet 25 is via TCP/IP data transmission as is know in the art. If the incoming call is unanswered, the call is diverted to the voicemail system 23 and a suitable notification sent to the recipient's VoIP phone.

While such VoIP systems present significant improvements in flexibility, dedicated VoIP phones are more expensive than standard PABX devices, such as analog or digital telephones. It would therefore be desirable to provide a system which not only provides for efficient call and voicemail handling analogous to the VoIP approach, but one which is backwards compatible with legacy telephone systems. It would also be desirable to provide a telecommunications system which is adaptable to systems having existing disparities between the technical level of an enterprise Information Technology (IT) infrastructure and its telephone system. For example, such a disparity may occur where an enterprise has an intranet, and retains a legacy PABX-based telephone system. It is a further object of the invention to provide additional functionality which leverages the functions of VoIP systems when coupled with an intranet and standard PABX-based systems, particularly in the context of voicemail handling.

SUMMARY OF THE INVENTION

One aspect the invention relates to a method of call management including the steps of:
receiving an incoming call;
transferring the call to an intended recipient device;
if the recipient device does not answer the incoming call, transferring the call to an intranet gateway;
if the intended recipient is logged on to the intranet or otherwise accessible on the network, the intranet gateway determining the network location of the intended recipient and transferring the call to the intended recipient;
if the intended recipient is inaccessible, transferring the incoming call to a call recordation system.

Preferably, the intranet gateway is a VoIP gateway.

If the intended recipient is accessible, the call is preferably routed to a network address at which resides hardware which is adapted to allow the call to be received by the intended recipient.

If the intended recipient is inaccessible, the call is preferably routed to a voicemail system and a notification sent to the intended recipient.

Preferably the transfer of the call to the intended recipient is performed using a standard PABX communication with a plurality of telephones.

The hardware residing at the intended recipients network address may correspond to a software-based VoIP phone.

The software-based VoIP phone may be running on a computer, laptop, Personal Digital Assistant (PDA) or similar device.

In an alternative embodiment, the VoIP gateway may transfer the call to the intended recipient via the Internet.

In another aspect, the invention relates to a method of call management including the steps of:
receiving an incoming call;
transferring the call to an intended recipient device;
if the recipient device does not answer the incoming call, transferring the call to a call recordation means;
intercepting the call and transferring the call to an intranet gateway;
if the intended recipient is logged on to the intranet or otherwise accessible on the network, the intranet gateway determining the network location of the intended recipient and transferring the call to the intended recipient;
if the intended recipient is inaccessible, transferring the incoming call to a call recordation system.

In yet another aspect, the invention relates to a method of call management including the steps of:
receiving an incoming call; transferring the call to an intended recipient device;
if the recipient device does not answer the incoming call, transferring the call to a call recordation means;
intercepting the call and transferring the call to an intranet gateway;
if the intended recipient is logged on to the intranet or otherwise accessible on the network, the intranet gateway determining the network location of the intended recipient and transferring the call to a physically proximate recipient device based on localisation information correlating to the physical location of the network connection with said proximate recipient device;
if the intended recipient is inaccessible, transferring the incoming call to a call recordation system.

The invention also relates to a computer system adapted to carry out the methods as hereinbefore defined.

The invention further relates to a telecommunications and networking system adapted to carry out the methods as hereinbefore defined.

The invention also relates to a memory storing a computer program for causing a computer to carry out the previously described methods.

BRIEF DESCRIPTION OF THE DRAWINGS

The present invention will now be described by way of example only and with reference to the drawings in which.

DETAILED DESCRIPTION OF THE DRAWINGS

Figure 3:
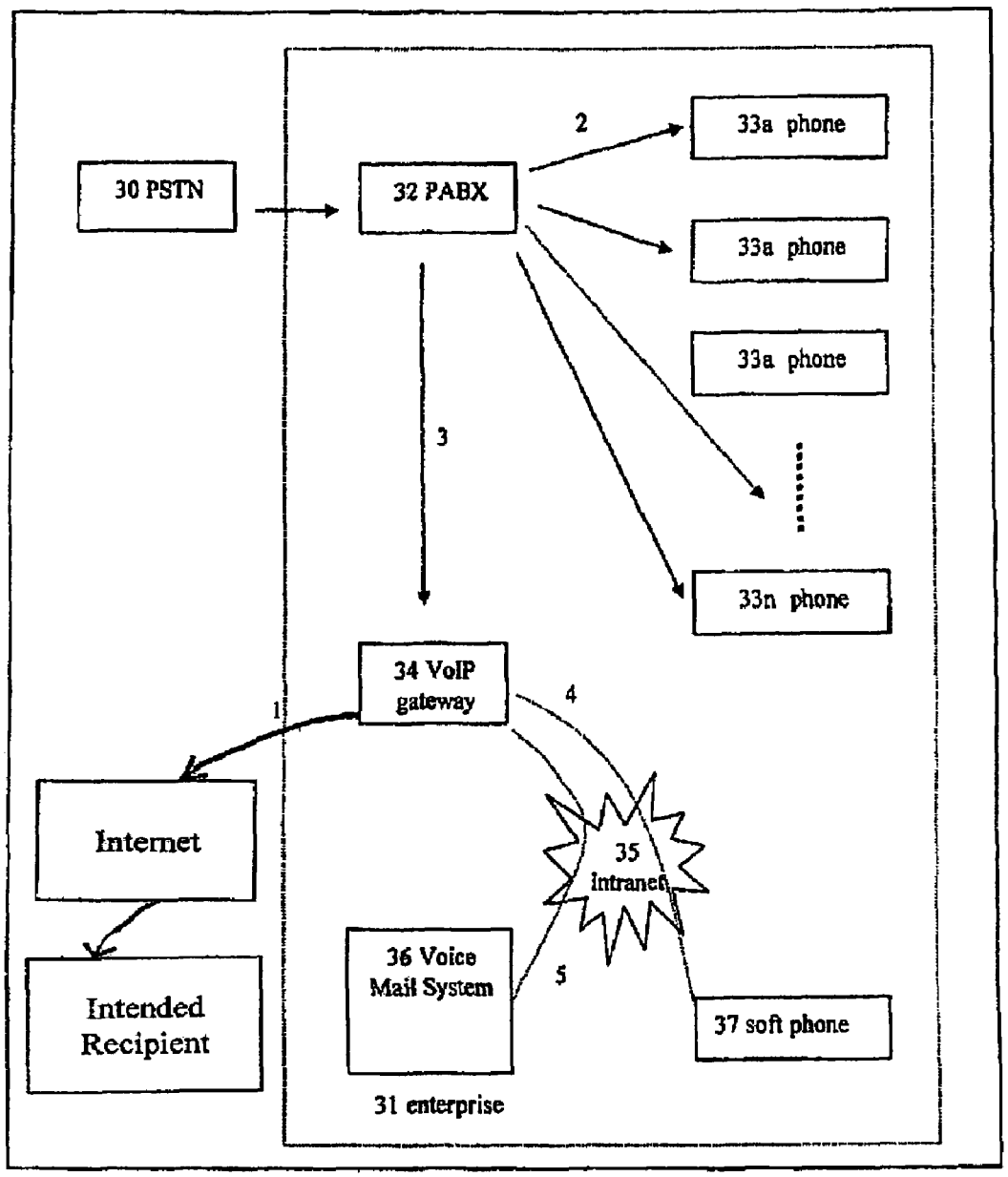
FIG. 3 is a block diagram of a legacy PABX system integrated with a dynamic VoIP voicemail switching system, in accordance with a preferred embodiment of the present invention.

FIG. 3 is a block diagram of an exemplary system, installed in an enterprise 31, for dynamic call management. The enterprise 31 is in the form of an intranet or other form of network which allows users to carry out the usual network functions such as sending/receiving email, accessing files etc. However, the enterprise 31 retains legacy equipment such as standard telephone units 33a, 33b etc. When an incoming call is received from the standard PSTN network 30, the call management system operates as follows.

Figure 1:
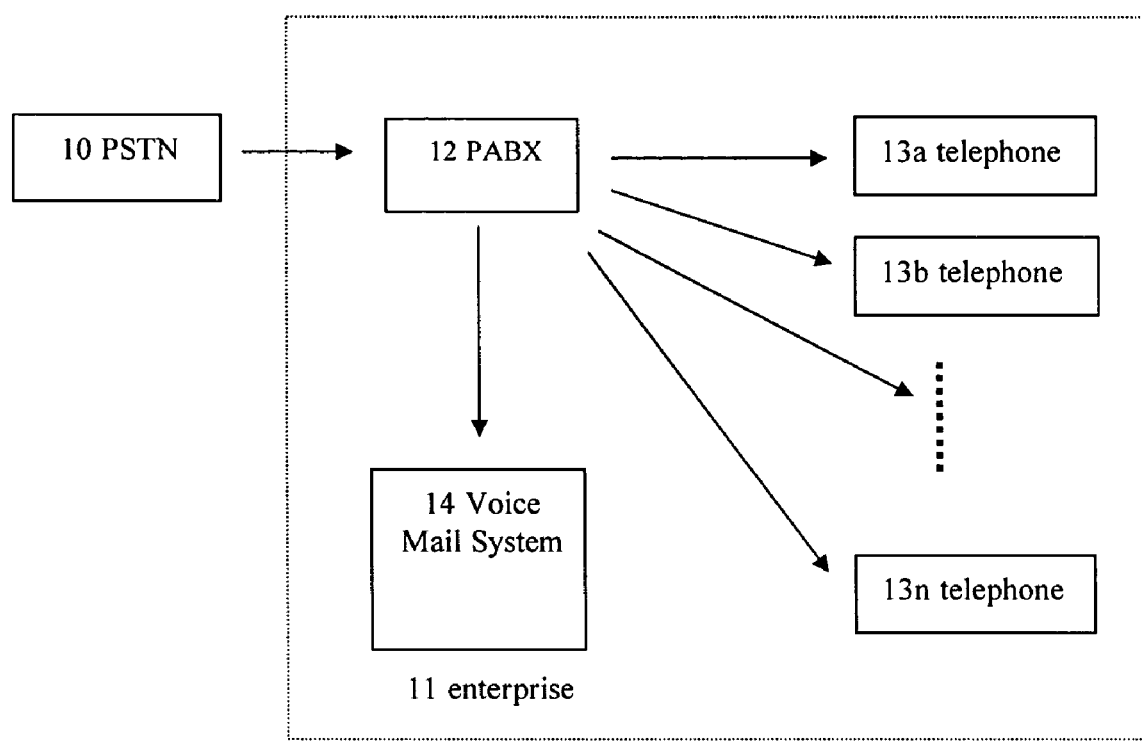
FIG. 1, as described, is a block diagram of a prior art PSTN and PABX system.
Figure 2:
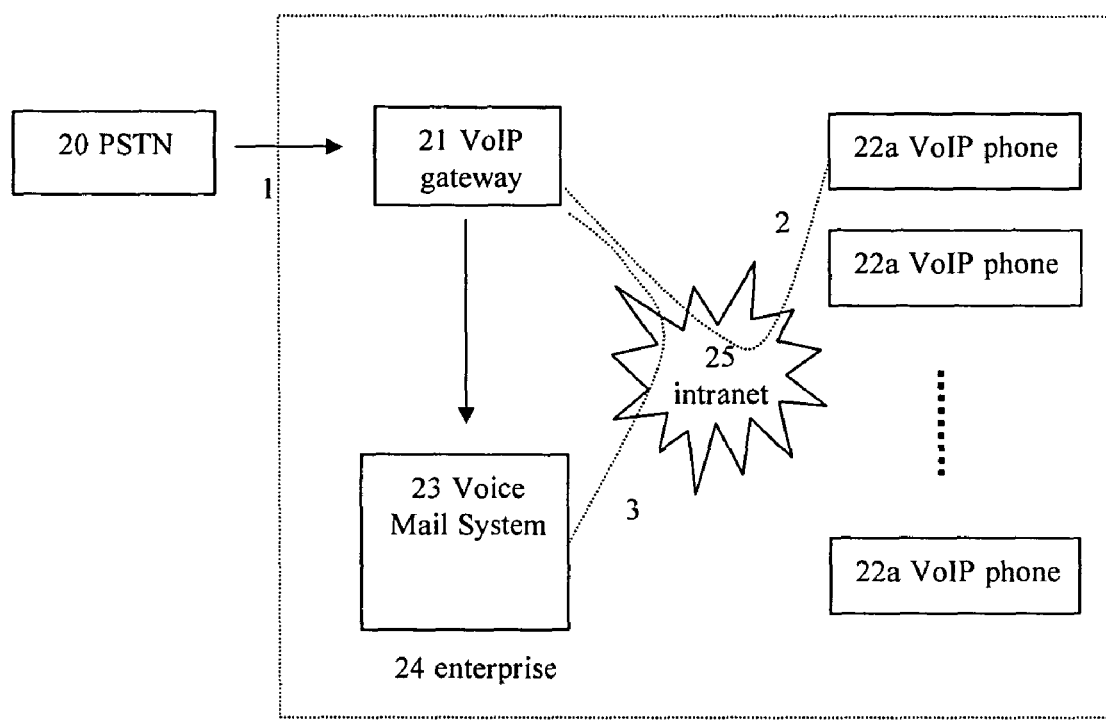
FIG. 2, as described, is a block diagram of a prior art voice over IP system.

The incoming call is received via a PSTN network 30. A standard PABX 32 receives the call and attempts to transfer it to an intended recipient at the allocated device 33 of the intended recipient. In the embodiment shown in FIG. 1, the recipient devices are standard telephones.

If the intended recipient does not answer the incoming call, the call is transferred to an intranet gateway In a preferred embodiment, the unanswered call is transferred to a voicemail system. However, this call is intercepted by an intranet VoIP gateway 34.

The gateway 34 then determines if the intended recipient is logged onto the intranet or is otherwise accessible on the network. If the user is found, the call is translated into a VoIP call and the intranet gateway transfers the call to the intended recipient at the network location 37 of the intended recipient. Normally, the user will have logged onto the intranet using a computer that has a soft phone 37 and this functionality is used by the user to answer the call.

If the intended recipient is inaccessible (i.e., not logged on), the call is released and transferred to a call recordation system. In this example, the call recordation system corresponds to a voicemail system 36. A voicemail message is left and a notification is transmitted to the user's telephone. In cases where the user may have been logged onto the network, but is using equipment which is not capable of receiving a VoIP call, in an alternative embodiment, a notification of a voicemail is sent as an email to the user at the network location of the user. Alternatively, a notification is sent via a Short Message Service (SMS) or similar means.

The telephones 33 can be standard analog or digital phones as are currently deployed in the enterprise; telephones 33 can also be soft-phones that can be software-based VoIP-based phones, capable of running on a standard computer. To this end, the software-based VoIP phone may be run on a computer, laptop computer, PDA or similar device. Also, it is envisaged that VoIP functionality can be implemented on mobile devices analogous to mobile phones or hybrid devices.

While the description herein has focussed on an enterprise-based intranet, the VoIP gateway may attempt to find the intended recipient on the Internet generally. Thus if the user is anywhere in the world logged onto the Internet using a VoIP-capable phone, a call can be transferred to him or her.

The system is extremely flexible in that it can be installed over the top of even a fairly primitive legacy telephone/PABX system. All that is required is the VoIP gateway and network connection. The fundamental telecommunications infrastructure within the enterprise remains the same. Thus the method and apparatus provide a substantial extension in the functionality of the communications of the enterprise with relatively little added cost.

From the caller's point of view, the process is entirely transparent. He or she dials the connection and is connected to the recipient wherever the recipient is located.

In an alternative embodiment, the network has access to localisation information which provides the VoIP gateway with physical location information corresponding to the present network address of the user. The call could then be transferred to a non-VoIP telephone which is situated proximate the user. This variant requires an accurate rule-based determination of the user's actual location. However, it is envisaged that such systems would be feasible with network address geographical localisation.

Further, as noted above, where the VoIP gateway is able to detect a user logged in on the Internet, the call can be transferred to virtually any geographical location. In this case, the user will need to have access to a VoIP-enabled device for receiving the call. Re-routing to a proximate telephone may not be possible as the VoIP gateway would need to execute an additional call to perform this operation. However, under certain circumstances the re-routing would be possible depending on the call forwarding capability of the VoIP gateway.

The methods by which the VoIP gateway determines the presence of the user on the network are known to those skilled in the art and are analogous to those used by instant messaging services. For brevity, details of such systems are not discussed in detail.

Thus, the method and apparatus provide a simple and cost-effective solution to the problem of re-routing calls to mobile users. It is anticipated that a legacy telephone system can be upgraded to this functionality with the addition of a single card/device acting as the VoIP gateway. Of course the users would need to have VoIP-enabled devices. However given that it is possible to provide such devices in software, this is a simple and inexpensive solution.

Although the invention has been described by way of example and with reference to particular embodiments it is to be understood that modification and/or improvements can be made without departing from the scope of the appended claims.

Where in the foregoing description reference has been made to integers or elements having known equivalents, then such equivalents are herein incorporated as if individually set forth.

The invention claimed is:

1. A method of telephone call management in a facility including an intranet and a gateway to the intranet, the method including the steps of:

receiving an incoming telephone call;

automatically transferring the incoming call to an intended recipient device without going through the intranet gateway;

if the recipient device does not answer the incoming call, automatically transferring the incoming unanswered call to the intranet gateway;

if the intended recipient is logged on to the intranet or is otherwise accessible on a network accessible via the gateway, the intranet gateway determining the location of the intended recipient and automatically transferring the incoming unanswered call to the intended recipient; but if the intended recipient is inaccessible; causing the intranet gateway to automatically transfer the incoming unanswered call to a call recordation system.

2. A method as claimed in claim 1 wherein the intranet gateway is a VoIP gateway that automatically converts the incoming unanswered call to a VoIP call, and the last two steps of claim 1 are performed on the converted VoIP call.

3. A method as claimed in claim 1 wherein if the intended recipient is accessible, routing the incoming unanswered call to a network address including hardware which is adapted to allow the incoming unanswered call to be received by the intended recipient.

4. A method as claimed in claim 3 wherein the hardware residing at the intended recipient's network address corresponds to a software-based VoIP phone.

5. A method as claimed in claim 4 wherein the software-based VoIP phone is running on a computer, laptop, PDA or similar device.

6. A method as claimed in claim 1 wherein if the intended recipient is inaccessible, automatically routing the incoming unanswered call to a voicemail system and automatically sending to the intended recipient a notification that the incoming unanswered call has been to the voicemail system.

7. A method as claimed in claim 1 wherein the transfer of the call to the intended recipient is effected via a standard PABX communication with a plurality of standard, non VoIP telephones.

8. A method as claimed in claim 1 wherein the intranet gateway automatically transfers the call to the intended recipient via the Internet.

9. A computer system adapted to carry out the method as claimed in claim 1.

10. A telecommunications system adapted to carry out the method as claimed in claim 1.

11. A computer readable medium or memory device including a program for causing a computer system to perform the method of claim 1.

12. A method as claimed in claim 1 wherein if the intended recipient is accessible, automatically routing the call to a network address including hardware that receives the call for the intended recipient.

13. A method of telephone call management in a facility including an intranet and a gateway to the intranet, the method including the steps of:

receiving an incoming telephone call;

automatically transferring the incoming call to an intended recipient device without going through the intranet gateway;

if the recipient device does not answer the incoming call, automatically transferring the incoming unanswered call to a call recordation arrangement;

intercepting the incoming unanswered call and automatically transferring the incoming unanswered call to the intranet gateway;

if the intended recipient is logged on to the intranet or is otherwise accessible on a network accessible via the gateway, the intranet gateway determining the location of the intended recipient and automatically transferring the incoming unanswered call to the intended recipient; but if the intended recipient is inaccessible, automatically causing the intranet gateway to transfer the incoming unanswered call to a call recordation system.

14. A method as claimed in claim 13 wherein the intranet gateway automatically transfers the call to the intended recipient via the Internet.

15. A computer system adapted to carry out the method as claimed in claim 13.

16. A telecommunications system adapted to carry out the method as claimed in claim 13.

17. A computer readable medium or memory device including a program for causing a computer system to perform the method of claim 13.

18. A method of telephone call management in a facility including an intranet and a gateway to the intranet, the method including the steps of:

receiving an incoming telephone call;

automatically transferring the incoming call to an intended recipient device without going through the intranet gateway;

if the recipient device does not answer the incoming call, automatically transferring the incoming unanswered call to a call recordation arrangement;

intercepting the incoming unanswered call and automatically transferring the incoming unanswered call to the intranet gateway;

if the intended recipient is logged on to the intranet or is otherwise accessible on a network accessible via the gateway, the intranet gateway determining the location of the intended recipient and automatically transferring the incoming unanswered call to a physically proximate recipient device based on information indicative of the physical location of a connection with said proximate recipient device; but if the intended recipient is inaccessible, automatically causing the intranet gateway to transfer the incoming unanswered call to a call recordation system.

19. A method as claimed in claim 18 wherein the intranet gateway automatically transfers the call to the intended recipient via the Internet.

20. A computer system adapted to carry out the method as claimed in claim 18.

21. A telecommunications system adapted to carry out the method as claimed in claim 18.

22. A computer readable medium or memory device including a program for causing a computer system to perform the method of claim 18.

* * * * *